United States Patent
Haefner

(10) Patent No.: US 9,988,947 B2
(45) Date of Patent: Jun. 5, 2018

(54) FAST ACTING SWITCHING VALVE TRAIN SYSTEM FOR VALVE DEACTIVATION

(71) Applicant: Schaeffler Technologies AG & Co. KG, Herzogenaurach (DE)

(72) Inventor: Donald Haefner, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 181 days.

(21) Appl. No.: 14/992,119

(22) Filed: Jan. 11, 2016

(65) Prior Publication Data

US 2017/0198610 A1 Jul. 13, 2017

(51) Int. Cl.
| | |
|---|---|
| *F01L 1/34* | (2006.01) |
| *F01L 1/20* | (2006.01) |
| *F16H 53/06* | (2006.01) |
| *F01L 1/18* | (2006.01) |

(52) U.S. Cl.
CPC .............. *F01L 1/205* (2013.01); *F01L 1/181* (2013.01); *F16H 53/06* (2013.01)

(58) Field of Classification Search
CPC ............ F01L 1/205; F01L 1/181; F16H 53/06
See application file for complete search history.

(56) References Cited

U.S. PATENT DOCUMENTS

| | | | |
|---|---|---|---|
| 4,221,201 A | 9/1980 | Soeters | |
| 4,222,354 A | 9/1980 | Uitvlugt | |
| 5,549,081 A * | 8/1996 | Ohlendorf | F01L 1/267 123/90.16 |
| 7,600,498 B2 | 10/2009 | Diggs | |
| 2001/0027773 A1 * | 10/2001 | Janak | F01L 1/181 123/321 |
| 2005/0205019 A1 * | 9/2005 | Burk | F01L 1/08 123/21 |

* cited by examiner

*Primary Examiner* — Zelalem Eshete
(74) *Attorney, Agent, or Firm* — Matthew V. Evans

(57) ABSTRACT

A fast acting valve train system for valve deactivation is provided that includes an actuator together with a switchable rocker arm. The actuator, controlled by the engine control unit and mounted to a structural housing, contains an actuator pin that retracts or extends facilitating either a deactivation or reactivation valve event. The switchable rocker arm is a two arm design that includes cam side and valve side arms that are coupled together with a locking mechanism assembly that interfaces with the actuator pin. The system is capable of fast switching times to meet the increased demands of cylinder deactivation systems.

14 Claims, 11 Drawing Sheets

FAST ACTING SWITCHING VALVE TRAIN SYSTEM FOR VALVE DEACTIVATION

TECHNICAL FIELD

Example aspects described herein relate to valve train systems that are used in internal combustion engines to actuate one or more intake and/or exhaust valves, and, more particularly, valve train systems that are used for selectively switching between full lift and no lift modes for one or more intake and/or exhaust valves.

BACKGROUND

More stringent fuel economy regulations have prompted the need for improved efficiency of the internal combustion (IC) engine. Lightweighting, friction reduction, thermal management, variable valve timing and a diverse array of variable valve lift technologies are all part of the technology toolbox for IC engine designers.

Variable valve lift (VVL) systems typically employ a technology in a valve train of an IC engine that allows different engine valve lifts to occur. The valve train consists of the components that are required to actuate an engine valve, including a camshaft, the valve and all components that lie in between. VVL systems are typically divided into two categories: continuous variable and discrete variable. Continuous variable valve lift systems are capable of varying a valve lift from a design lift minimum to a design lift maximum to achieve any of several lift heights. Discrete variable valve lift systems are capable of switching between two or three distinct valve lifts. Components that enable these different valve lift modes are often called switchable valve train components. Typical two-step discrete valve lift systems switch between a full valve lift mode and a partial valve lift mode, often termed cam profile switching, or between a full valve lift mode and a no valve lift mode that facilitates deactivation of the valve. Valve deactivation can be applied in different ways. In the case of a four-valve-per-cylinder configuration (two intake+two exhaust), one of two intake valves can be deactivated. Deactivating only one of the two intake valves can provide for an increased swirl condition that enhances combustion of the air-fuel mixture. In another scenario, all of the intake and exhaust valves are deactivated for a selected cylinder which facilitates cylinder deactivation. On most engines, cylinder deactivation is applied to a fixed set of cylinders, when lightly loaded at steady-state speeds, to achieve the fuel economy of a smaller displacement engine. A lightly loaded engine running with a reduced amount of active cylinders requires a higher intake manifold pressure, and, thus, greater throttle plate opening, than an engine running with all of its cylinders in the active state. Given the lower intake restriction, throttling losses are reduced in the cylinder deactivation mode and the engine runs with greater efficiency. For those engines that deactivate half of the cylinders, it is typical in the engine industry to deactivate every other cylinder in the firing order to ensure smoothness of engine operation while in this mode. Deactivation also includes shutting off the fuel to the dormant cylinders. Reactivation of dormant cylinders occurs when the driver demands more power for acceleration. The smooth transition between normal and partial engine operation is achieved by controlling ignition timing, cam timing and throttle position, as managed by the engine control unit (ECU). Examples of switchable valve train components that serve as cylinder deactivation facilitators include roller lifters, pivot elements, rocker arms and camshafts; each of these components is able to switch from a full valve lift mode to a no valve lift mode. The switching of lifts occurs on the base circle or non-lift portion of the camshaft; therefore the time to switch from one mode to another is limited by the time that the camshaft is rotating through its base circle portion; more time for switching is available at lower engine speeds and less time is available at higher engine speeds. Maximum switching engine speeds are defined by whether there is enough time available on the base circle portion to fully actuate a locking mechanism to achieve the desired lift mode.

The precision of control of the deactivated cylinders varies within the engine industry. For optimum performance of the system, selective cylinder control rather than simultaneous multiple cylinder control is recommended. With selective cylinder control, the timing of the valve deactivation event with respect to the combustion cycle is maintained for each individual cylinder; for example, in a selective cylinder control system, an exhaust charge is normally trapped in the cylinder, which serves as an air spring and aids oil control during the deactivated mode. This is typically accomplished by deactivating the exhaust valve(s) first, followed by deactivation of the intake valve(s) of a given cylinder. With simultaneous multiple cylinder control, the timing of the valve deactivation event with respect to the combustion cycle is not controlled to the extent of the selective cylinder control resulting in intermittent exhaust charge trapping.

In today's IC engines, many of the switchable valve train components that enable valve deactivation for cylinder deactivation contain a locking mechanism that is actuated by an electro-hydraulic system. The electro-hydraulic system typically contains at least one solenoid valve within an array of oil galleries that manages engine oil pressure to either lock or unlock the locking mechanism within the switchable valve train component to enable a valve lift switching event. These types of electro-hydraulic systems require time within the combustion cycle to actuate the switchable valve train component. FIG. 1 shows a diagram of a total actuation time, termed "system response time" for a typical electro-hydraulic system to unlock a switchable valve train component. The system response time can be broken into three segments. A first time segment, solenoid valve response time (termed "magnetic"), is defined as a time required for a coil of a solenoid valve to build enough current to move an armature through its stroke after the solenoid receives its signal from an ECU. A second time segment, hydraulic pressure propagation (termed "hydraulic"), is defined as a time required for oil pressure to propagate within an oil control gallery from a solenoid valve to a locking mechanism of a switchable valve train component. A third time segment, locking mechanism travel (termed "mechanical"), is defined as a time required for the locking mechanism to complete its actuation stroke. The first time segment is influenced by system voltage, oil pressure, oil temperature, tolerances/fits of components of the solenoid valve, and contamination; the second time segment is influenced by oil gallery volume, oil circuit flow restrictions, oil aeration, oil temperature and oil pressure; and the third time segment is influenced by oil aeration, oil temperature, oil pressure, tolerances/fits of the locking mechanism, displaced volume of the locking mechanism(s), and contamination. One that is familiar with the art of hydraulic switching valve train components can understand that the second time segment (hydraulic) is significantly dependent on the kinematic viscosity of the oil, which is a function of oil grade and temperature. For this reason, the allowable deactivated mode operating range is often limited by oil temperature due to increased system response times with reduced oil temperatures.

In most IC engine applications, switchable valve train components for cylinder deactivation in an electro-hydraulic system are classified as "pressureless-locked", which equates to:
a). In a no or low oil pressure condition, the spring-biased locking mechanism will be in a locked position, facilitating the function of a standard valve train component that translates rotary camshaft motion to linear valve motion; and,
b). In a condition in which engine oil pressure is delivered to the locking mechanism that exceeds the force of the locking mechanism bias spring, the locking mechanism will be displaced a given stroke to an unlocked position, facilitating valve deactivation where the rotary camshaft motion is not translated to the valve.

"Pressureless-unlocked" electro-hydraulic systems can be found in some cam profile switching systems that switch between a full valve lift and a partial valve lift, which equates to:
a). In a no or low oil pressure condition, the spring-biased locking mechanism will be in an unlocked position, facilitating a partial valve lift event; and,
b). In a condition in which engine oil pressure is delivered to the locking mechanism that exceeds the force of the locking mechanism bias spring, the locking mechanism will be displaced a given stroke to a locked position, facilitating a full valve lift event.

Switching valve train components are often larger in size and mass when compared to non-switching or standard valve train components and remains a constant challenge. The increased mass typically equates to an increased rotational mass or mass moment of inertia, which requires a potential increase in valve spring force to maintain contact of the valve train components throughout the entire engine speed range. Such a force increase often equates to increased stresses, wear, and friction between rubbing interfaces of the valve train system. For this reason, a minimized rotational mass is always desired in a switching valve train component.

With the successful implementation of cylinder deactivation systems on millions of production engines, engine manufacturers are now looking to expand the operating range. Examples include switching at higher engine speeds along with switching at colder oil temperatures. In addition, a new type of cylinder deactivation is in development that expands the deactivated mode operating range, increases the number of deactivating cylinders, and increases the frequency of switching in and out of a deactivated mode. In this new type of cylinder deactivation, all cylinders, as opposed to a group of cylinders, are continuously switched on and off depending on the demanded engine output. By controlling the engine output over a larger operating range in this way instead of by conventional throttling, pumping losses are reduced even further compared to traditional cylinder deactivation systems and, thus, a higher engine efficiency is achieved. In order to meet the increased system demands of such new cylinder deactivation systems, a solution to reduce the actuation time for valve deactivation and subsequent reactivation is needed. Furthermore, a solution is required that does not add additional rotating mass to the switching valve train component in order to minimize the valve spring force requirements, which reduces stress, wear, and friction in the valve train system.

SUMMARY OF THE INVENTION

A fast-acting switchable rocker arm system for valve deactivation is provided that includes a switchable rocker arm and an actuator assembly mounted independently from the rocker arm. The switchable rocker arm rotates about a rocker shaft and includes a valve arm assembly and a cam arm assembly. The valve arm assembly includes a valve arm housing with a rocker shaft bore and a shuttle pin bore with two open ends that contains a shuttle pin. The cam arm assembly includes a cam arm housing with a rocker shaft bore and a locking pin bore that contains a locking pin and a bias spring. The locking pin travels axially within the locking pin bore and, through a force provided by the locking pin bias spring, penetrates one of the open ends of the shuttle pin bore to engage the valve arm housing and achieve a locked mode. In the locked mode, the valve side arm assembly is coupled to the cam side arm assembly to enable a full valve lift event. To achieve an unlocked mode, the actuator assembly vertically extends an actuator pin that interfaces with an exposed end of the shuttle pin (opposite the side that interfaces with the locking pin) to force the shuttle pin to move axially against the locking pin and the opposing bias spring force until the locking pin disengages from the valve arm assembly. In the unlocked mode, the valve side arm assembly is de-coupled from the cam side arm assembly to enable a no valve lift event. While in the unlocked position, the cam side arm assembly is actuated by the camshaft causing it to rotate about the rocker shaft. A lost motion spring can be engaged with the cam side arm assembly to maintain control and position of the cam side arm assembly during the unlocked condition. A hydraulic lash adjuster can be applied to the valve side arm assembly to provide maintenance-free valve lash control. The cam side arm assembly can include a cam roller follower to provide a low friction interface with the camshaft. Different embodiments exist for the actuator pin and the shuttle pin. In one embodiment, the actuator pin has an angled side to interface with the shuttle pin. In another embodiment, the actuator pin has a frusto-conical end to interface with the shuttle pin. In yet another embodiment, the shuttle pin has a frusto-conical end to interface with the actuator pin. For improved system stiffness and actuation time, the actuator pin can be supported by a housing or other alternative structure within the engine.

BRIEF DESCRIPTION OF DRAWINGS

The above mentioned and other features and advantages of the embodiments described herein, and the manner of attaining them, will become apparent and be better understood by reference to the following descriptions of multiple example embodiments in conjunction with the accompanying drawings. A brief description of the drawings now follows.

DETAILED DESCRIPTION OF THE INVENTION

Identically labeled elements appearing in different figures refer to the same elements but may not be referenced in the description for all figures. The exemplification set out herein illustrates embodiments which should not be construed as limiting the scope of the claims in any manner.

Figure 2:
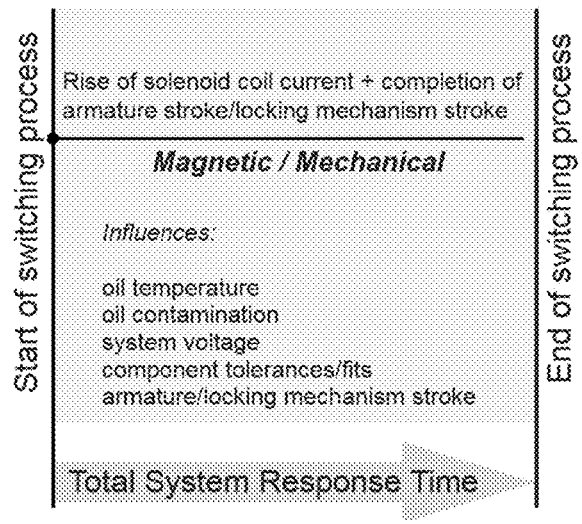
FIG. 2 is a system response time diagram for an electro-mechanical switchable valve train system.
Figure 3:
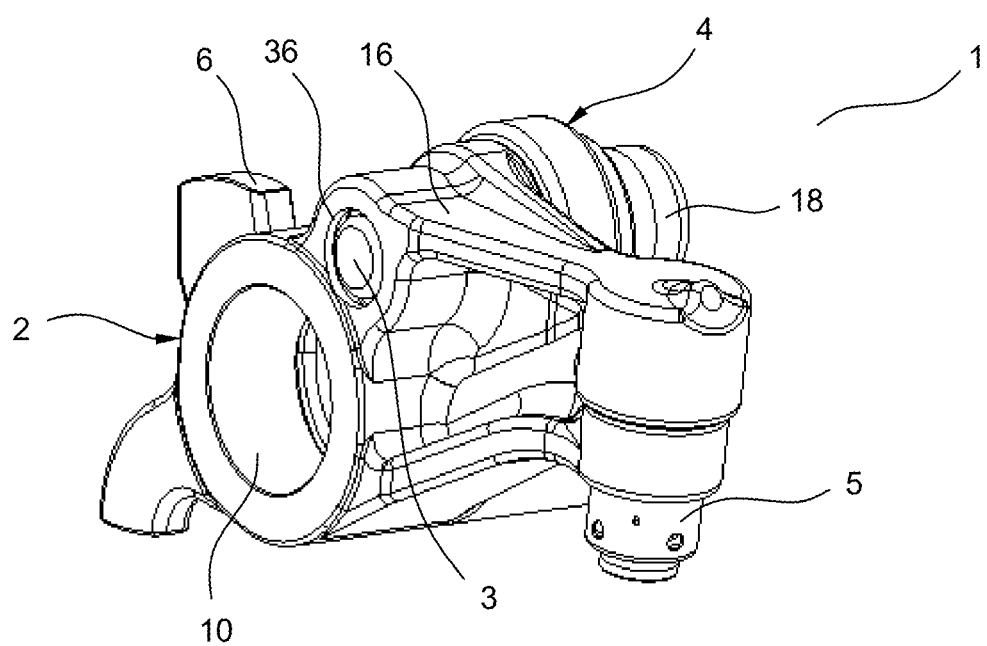
FIG. 3 is a perspective view of a fast-acting switchable rocker arm.
Figure 4:
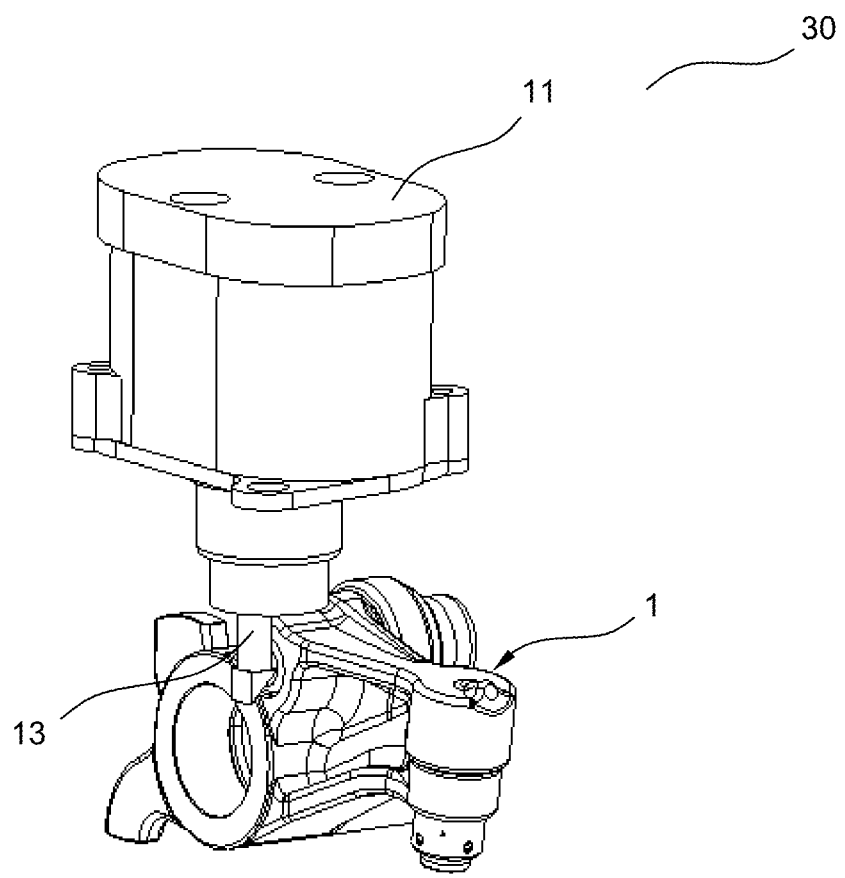
FIG. 4 is a perspective view of the fast-acting switchable rocker arm of FIG. 3 together with an actuator and a first embodiment of an actuator pin.
Figure 5:
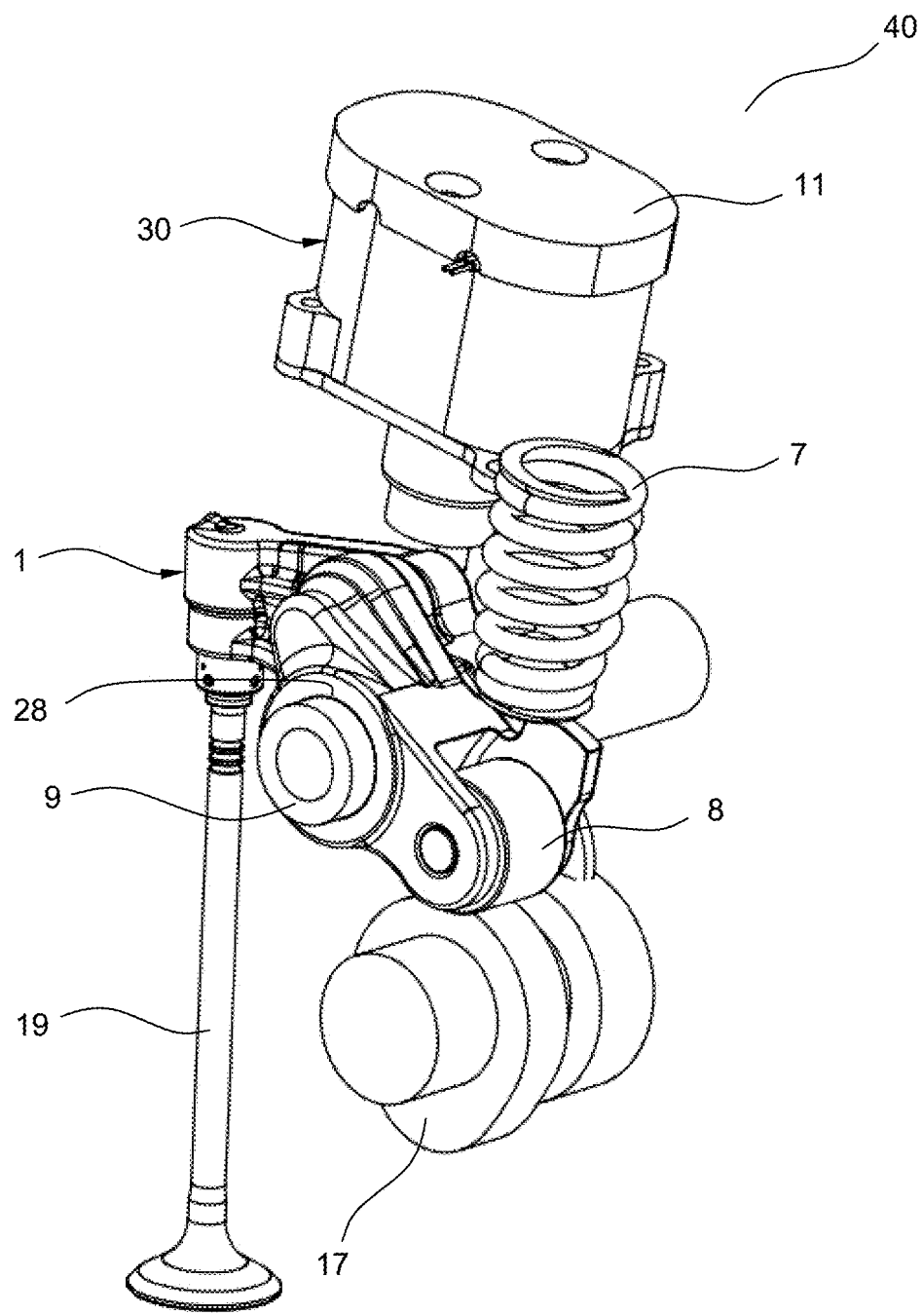
FIG. 5 is a perspective view of the system of FIG. 4 within a switchable valve train system of an internal combustion engine.
Figure 6:
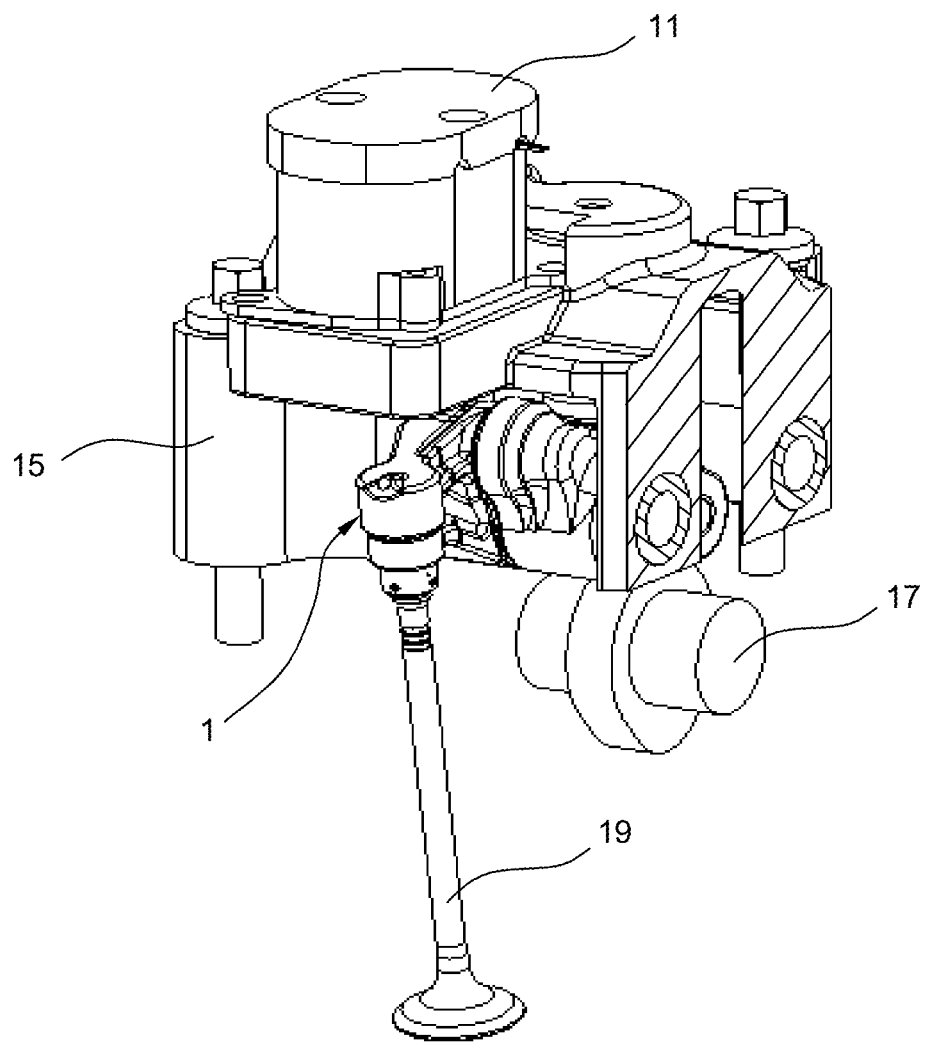
FIG. 6 is a perspective view of the system of FIG. 5 within a partial cylinder head section of an internal combustion engine.
Figure 7A:
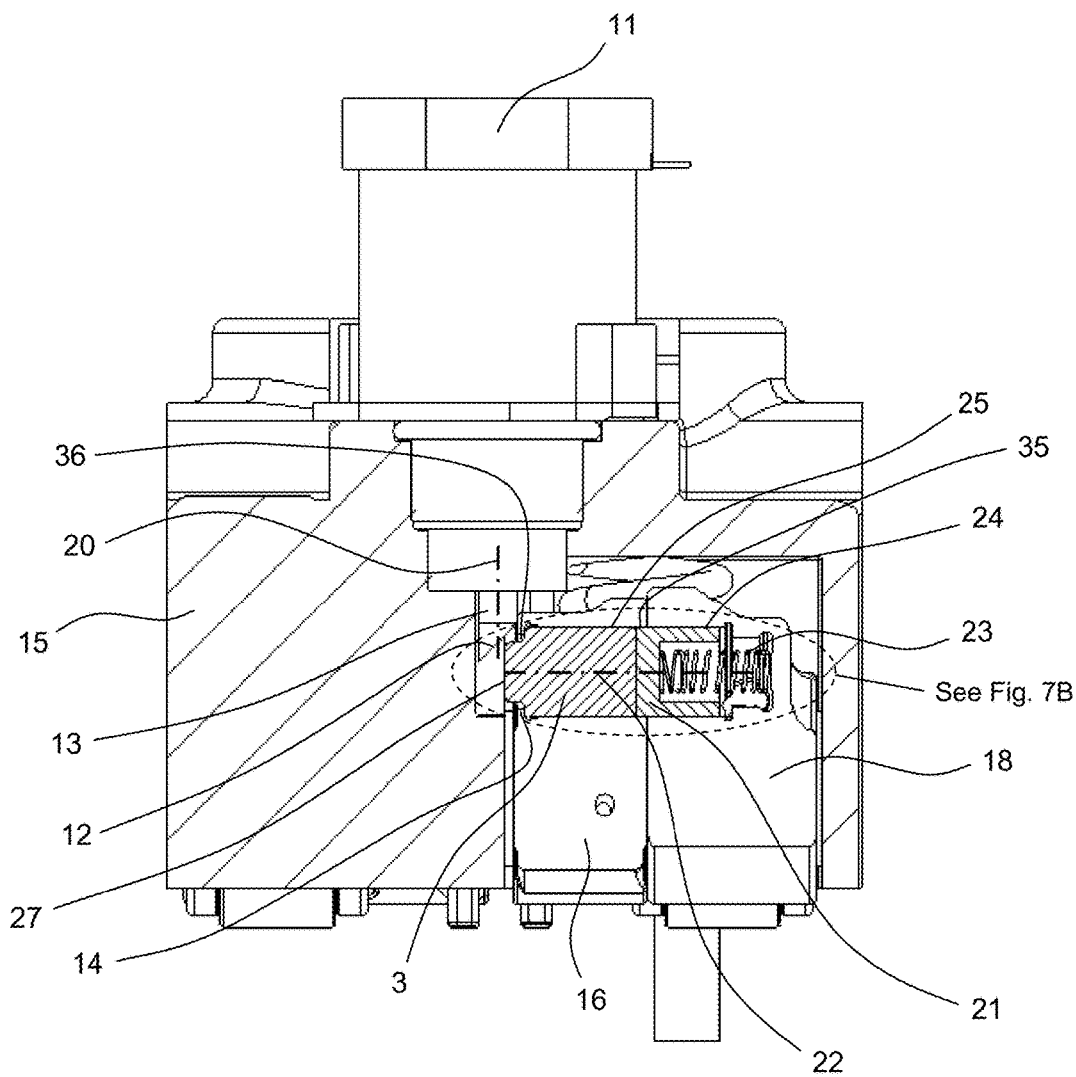
FIG. 7A is a cross-sectional view of the system of FIG. 6, with the switchable rocker arm in a locked state.
Figure 8A:
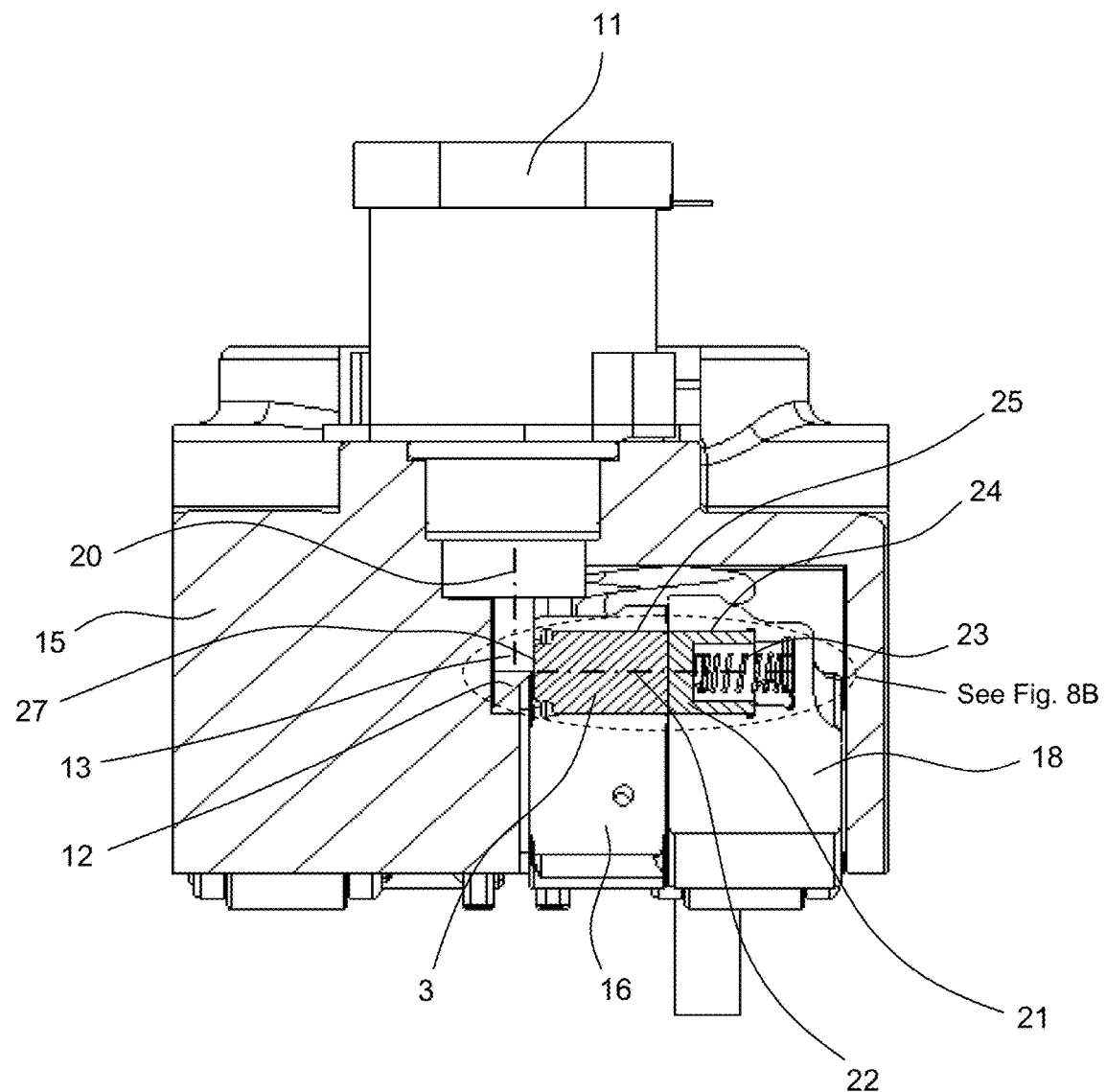
FIG. 8A is a cross-sectional view of the system of FIG. 6, with the switchable rocker arm in an unlocked state.

Referring to FIG. 3, a fast-acting switchable rocker arm 1 for valve deactivation is shown that can achieve fast actuation and reactivation times to meet the demands of new cylinder deactivation systems. Referring now to FIG. 4, a fast-acting switchable rocker arm system 30 is shown that includes the switchable rocker arm 1 of FIG. 3 together with an actuator 11 that controls an actuator pin 13. FIG. 5 shows the fast-acting switchable rocker arm system 30 of FIG. 4 within a switchable valve train system 40. FIG. 6 shows the switchable valve train system 40 within a sectioned cylinder head 15 of an IC engine. FIG. 7A shows the switchable rocker arm 1 in a locked condition while FIG. 8A shows the switchable rocker arm 1 in an unlocked condition. The following discussion should be viewed in light of FIGS. 2-6 together with FIGS. 7A and 8A.

The switchable rocker arm 1 has a cam side arm assembly 4 and an adjacent valve side arm assembly 2. The cam side arm assembly 4 contains a cam side arm housing 18, a rocker shaft bore 28, a cam roller follower 8, a locking pin bore 24, a locking pin 21, and a locking pin bias spring 23, also referred to herein as a resilient element. Optionally, the cam roller follower 8 may be removed and another interface for a camshaft 17 can be implemented. The valve side arm assembly 2 contains a valve side arm housing 16, a hydraulic lash adjuster 5, a rocker shaft bore 10, a shuttle pin bore 25, and a shuttle pin 3. The shuttle pin bore 25 has a first open end 35 and a second end 36 that is at least partially open for actuation access. Optionally, the hydraulic lash adjuster 5 may be removed and another interface for the engine valve 19 can be implemented.

The switchable rocker arm 1 is capable of two discrete valve lift modes: full valve lift and no valve lift. Full valve lift is achieved when the cam side arm assembly 4 is locked to the valve side arm assembly 2, thereby, when the camshaft 17 rotates against the cam roller follower 8, which is attached to the cam side arm assembly 4, the switchable rocker arm 1 rotates as one unit about a rocker shaft 9, causing the valve 19 to open. FIG. 7A illustrates a "locked" condition that facilitates a full valve lift mode. With the actuator pin 13 in its retracted position the locking pin bias spring 23 acts upon the locking pin 21 which pushes the shuttle pin 3 against a stop 14. The stop 14 could also be in the form of another design element that offers containment, including the actuator pin 13. Since the locking pin 21 has simultaneous engagement with the valve side arm assembly 2 and the cam side arm assembly 4, both arms are rotationally locked, thereby, the valve side arm assembly 2 rotates with the cam side arm assembly 4 when the cam side arm assembly 4 is acted upon by the camshaft 17.

In order to facilitate a no valve lift or deactivated mode, the cam side arm assembly 4 is unlocked from the valve side arm assembly 2. FIG. 8A illustrates an "unlocked" condition that facilitates a no valve lift mode. With the actuator pin 13 in an extended position, the locking pin 21 is no longer engaged with the shuttle pin bore 25 of the valve side arm assembly 2. This position of the locking pin 21 detaches the valve side arm assembly 2 from the cam side arm assembly 4; thereby, when the camshaft 17 rotates against the cam roller follower 8, the cam side arm assembly 4 rotates about the rocker shaft 9, while the valve side arm assembly 2 remains stationary and the valve 19 is not actuated, fulfilling a no valve lift or deactivated mode. A lost motion spring 7, also referred to herein as a lost motion resilient element, is present within the switchable valve train system 40 to provide adequate force to maintain a controlled rotational motion of the cam side arm assembly 4 during the deactivated mode and to facilitate alignment of the locking pin 21 with the shuttle pin bore 25 during the base circle or non-lift portion of the camshaft 17. The force of the lost motion spring 7 is applied to the cam side arm assembly 4 via a lost motion interface 6. Other known methods, spring types and interfaces for lost motion management could also be applied.

Figure 1:
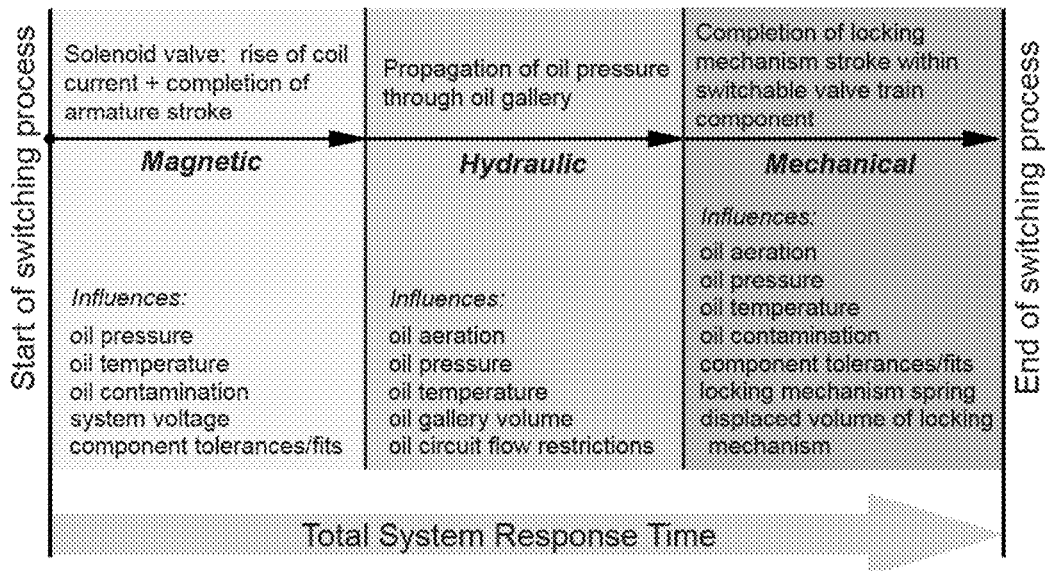
FIG. 1 is a system response time diagram for a prior art electro-hydraulic switchable valve train system.

Referring now specifically to FIGS. 7A and 8A, extension and retraction of the actuator pin 13 along a central axis 20, which directly interfaces with an end 27 of the shuttle pin 3, provides for the respective unlocked (no valve lift mode) and locked (full valve lift mode) positions. The actuator pin 13 can be supported on one side by the cylinder head 15, which reduces pin deflection and provides repeatable switching performance. An angled interface 12 on the opposite side contacts the end 27 of the shuttle pin 3 to yield axial displacement of the shuttle pin 3 along a central axis 22. The timing of the stroke of the actuator pin 13 is controlled by a solenoid actuator 11 that is managed by the ECU. Given the electrical control, coupled with the previously described mechanical actuation, this system can be classified as "electro-mechanical." FIG. 2 depicts a system response time diagram for this electro-mechanical actuation system. Compared to FIG. 1 which shows a system response time for an "electro-hydraulic" system, FIG. 2 combines segments 1 and 3, while eliminating segment 2. Combining segments 1 and 3 is possible because of the direct interface between the actuator pin 13 and the shuttle pin 3. Segment 2 can be removed because engine oil pressure is no longer required for actuation of the locking mechanism. This change in actuation method reduces the impact of oil temperature and resultant kinematic viscosity on the system response time. While oil still serves as a lubricating medium for the moving actuator 11 and switching rocker arm 1 components, the effect of cold oil temperature on response time is less pronounced in this role versus its additional actuation role within the electro-hydraulic system. Given the shorter system response time, this electro-mechanical system is able to meet the actuation time demands of new cylinder deactivation systems with expanded operating range and switching frequency requirements. In addition to the shorter system response time of the electro-mechanical system, the actuation system is made simpler by the fact that no oil galleries are required to deliver pressurized oil to actuate the locking mechanism. The elimination of the oil galleries reduces the manufacturing complexity which includes costly machining, deburring and washing processes. Yet another advantage of this electro-mechanical system is the independent mounting of the actuator 11 such that the mass of the actuation device is not part of the rotating mass of the rocker arm. Any additional rotating mass would potentially require additional valve spring force to maintain contact amongst the valve train components at higher speeds and, thus, increasing the stress, wear and resultant friction between the rubbing interfaces.

Figure 7B:
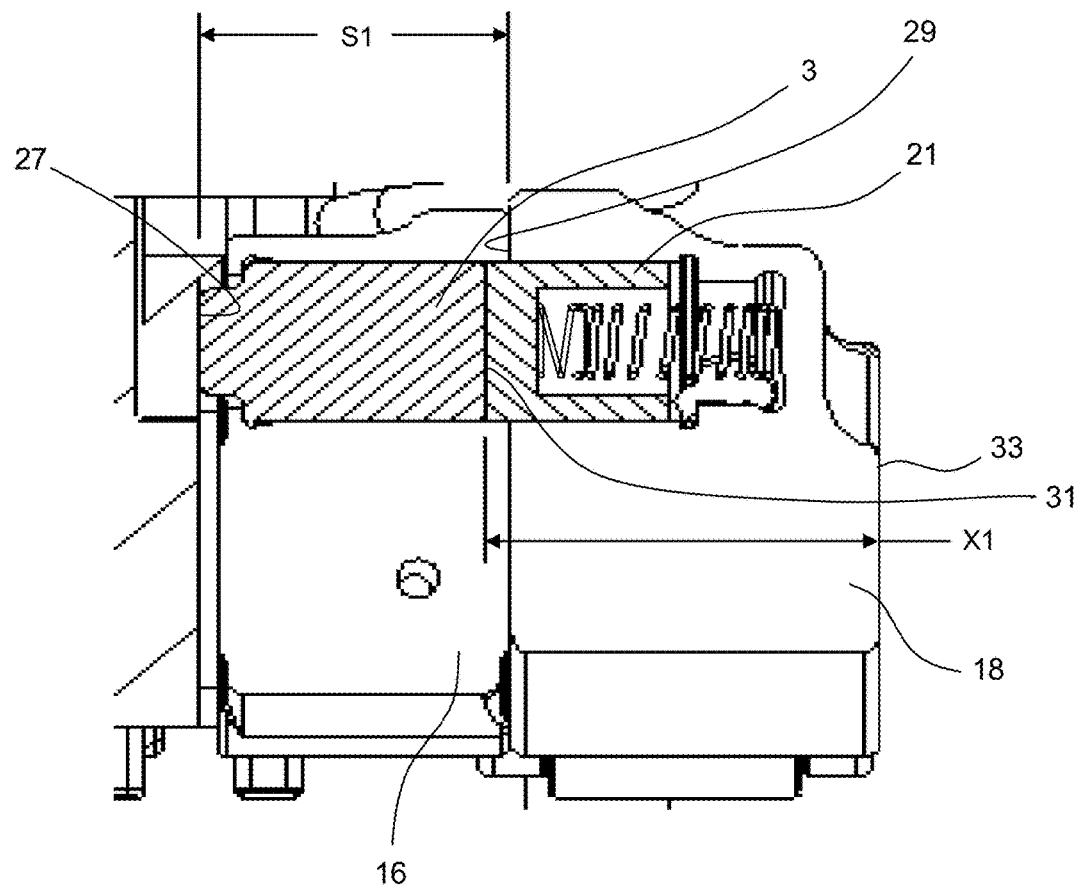
FIG. 7B is a detailed view taken from FIG. 7A.
Figure 8B:
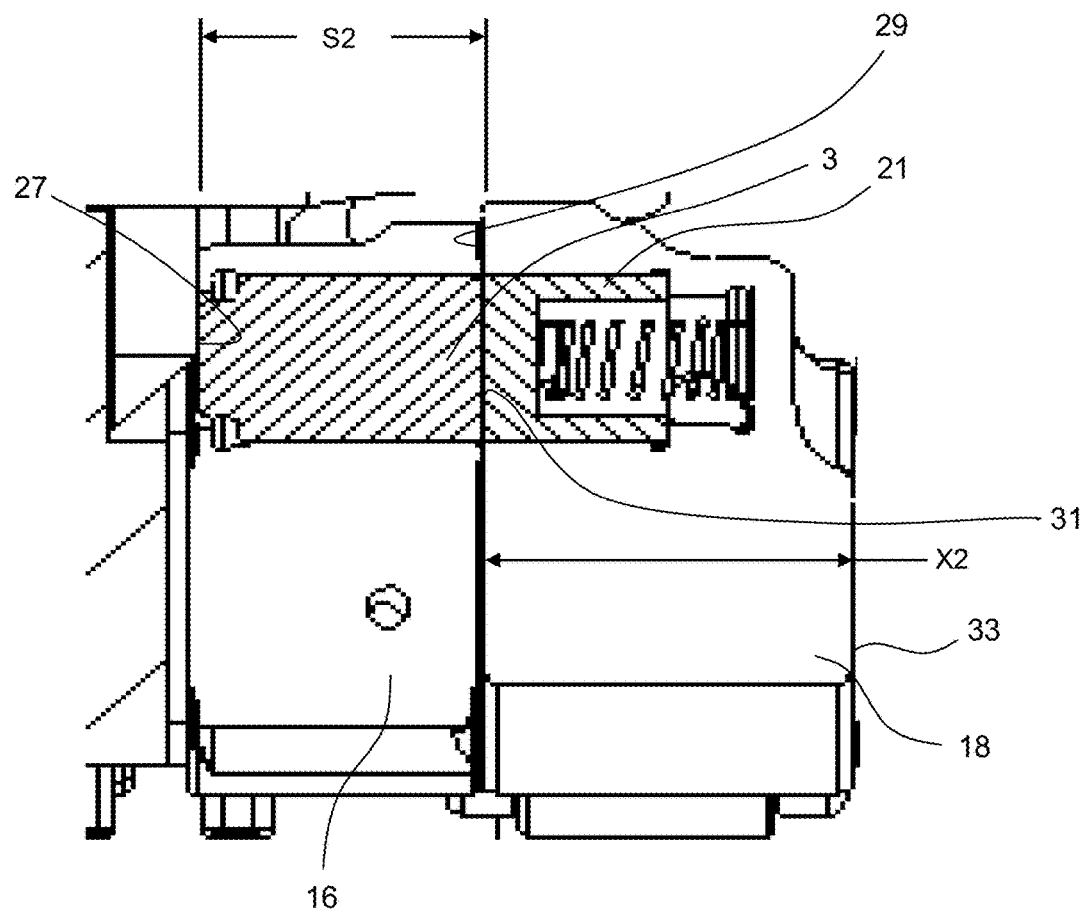
FIG. 8B is a detailed view taken from FIG. 8A.

Referring now to FIGS. 7B and 8B, the respective locking pin 21 and shuttle pin 3 positions in the locked and unlocked modes are shown. For the locked positions shown in FIG. 7B, a length S1 indicates a distance from the end 27 of the shuttle pin 3 to an axial face 29 of the valve side arm housing 16; additionally, a length X1 indicates a distance from an end 31 of the locking pin 21 to an axial face 33 of the cam side arm housing 18. For the unlocked positions shown in FIG. 8B, a length S2 indicates a distance from the end 27 of the shuttle pin 3 to the axial face 29 of the valve side arm housing 16, while a length X2 indicates a distance from the end 31 of the locking pin 21 to the axial face 33 of the cam side arm housing 18. Comparison of the respective lengths from FIGS. 7B and 8B yields the following relationships:

X2<X1

S2<S1

As evident by the position change of the locking pin 21 relative to the axial face 33 of the cam side arm housing 18 in the locked and unlocked positions, the compressed length of the locking pin bias spring 23 is greater in the locked position than in the unlocked position.

Figure 9:
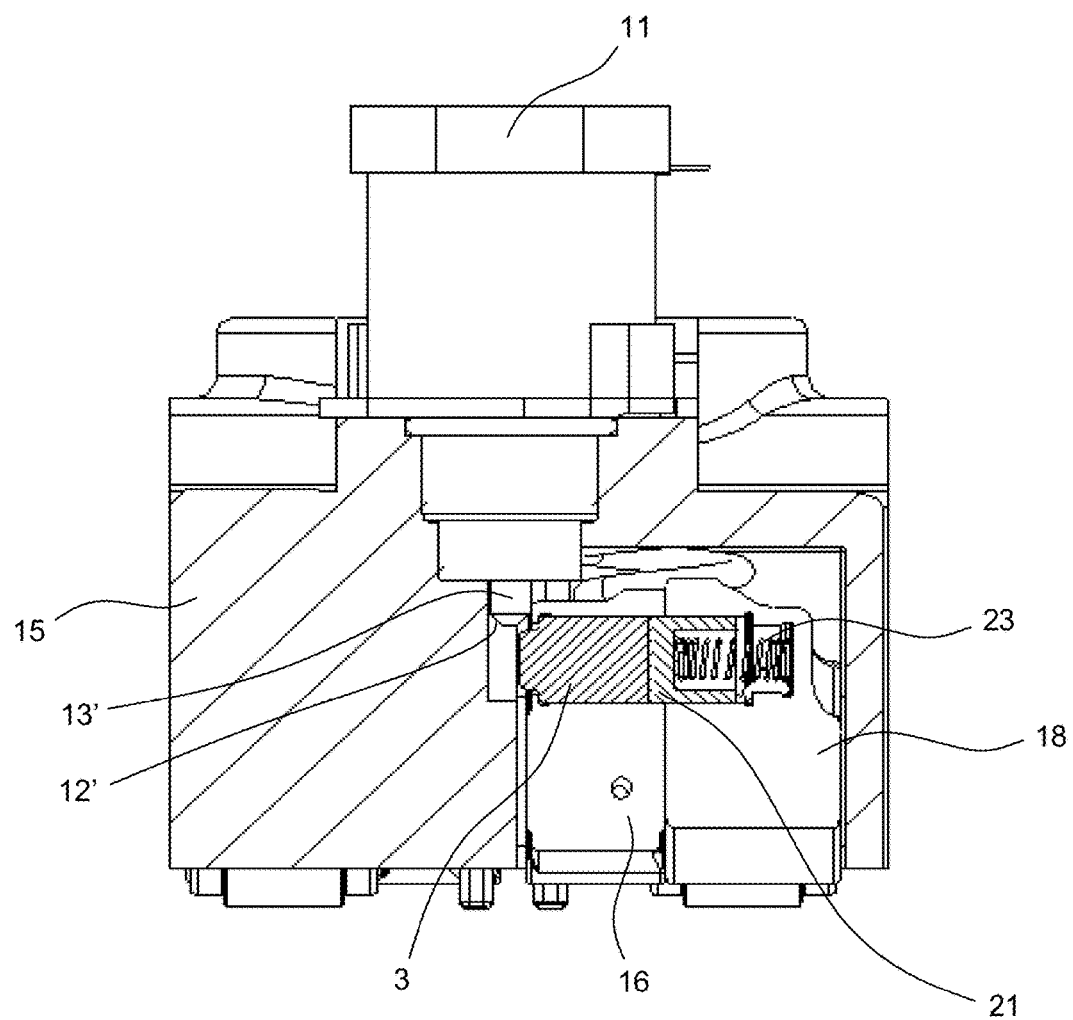
FIG. 9 is a cross-sectional view of the system of FIG. 6, with a second embodiment of a solenoid valve actuator pin with the switchable rocker arm in a locked state.

FIG. 9 shows a second embodiment of an actuator pin 13' which contains a frusto-conical interface 12' for contact with the shuttle pin 3. The frusto-conical interface 12' eliminates a need to prevent rotation of the actuator pin 13'.

Figure 10:
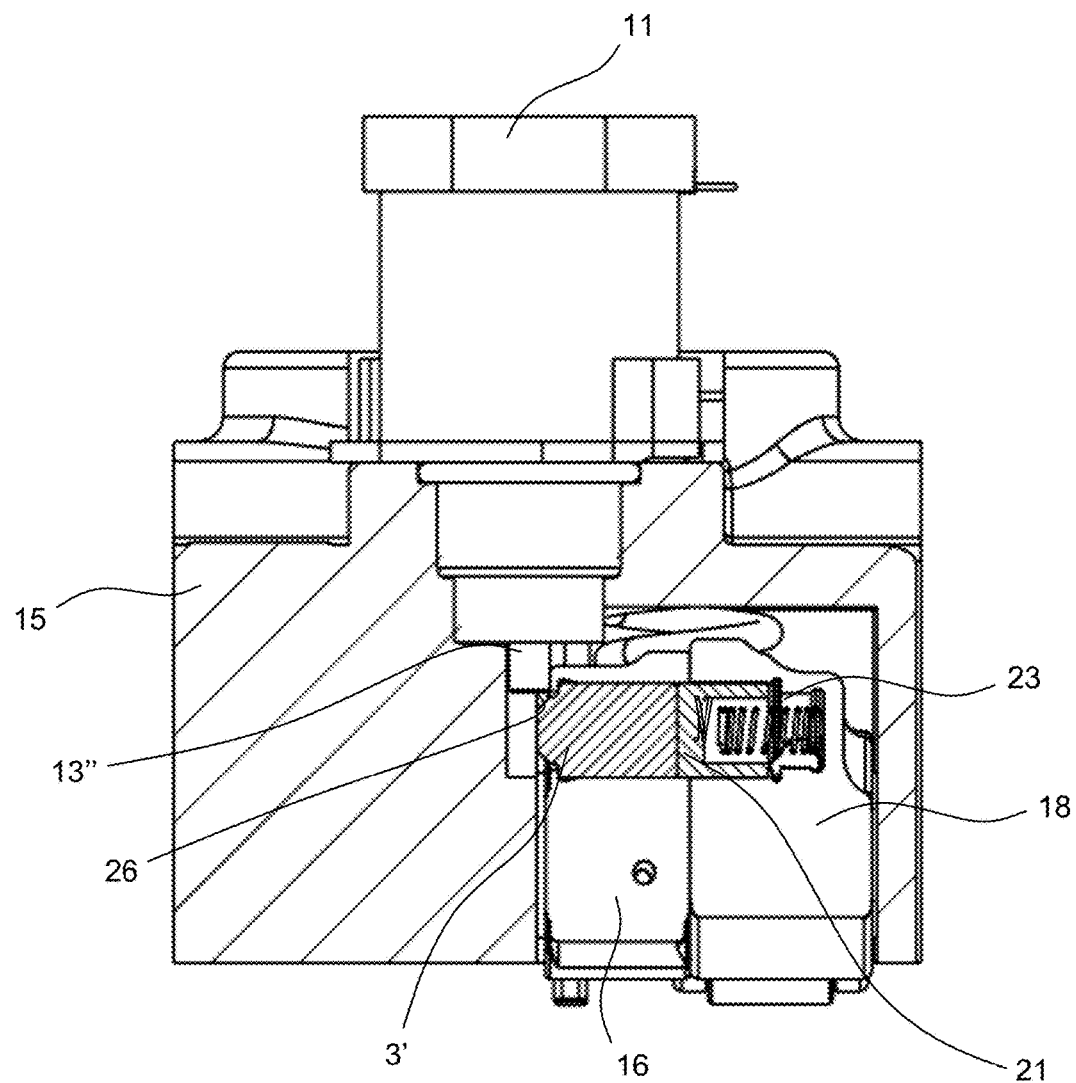
FIG. 10 is a cross-sectional view of the system of FIG. 6, with a third embodiment of a solenoid valve actuator pin and a second embodiment of a shuttle pin with the switchable rocker arm in a locked state.

FIG. 10 shows a second embodiment of a shuttle pin 3' which contains a frusto-conical interface 26 for contact with a third embodiment of an actuator pin 13". The form of the actuator pin 13" also eliminates the need to prevent rotation and also facilitates potential use of a current production component.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. A switchable rocker arm comprising:
    a cam arm assembly including a first housing with a first rocker shaft bore and a locking pin bore;
    a valve arm assembly, axially adjacent to the cam arm assembly, the valve arm assembly including a second housing with a second rocker shaft bore and a shuttle pin bore with two at least partially open ends; wherein, the second rocker shaft bore is axially aligned with the first rocker shaft bore; and
    a coupling assembly, including a locking pin arranged at least partially within the locking pin bore, and a shuttle pin arranged at least partially within the shuttle pin bore with a first end of the shuttle pin engaging the locking pin, and a second end of the shuttle pin configured to be engaged by an actuator pin arranged within an actuator.

2. The switchable rocker arm of claim 1, including:
    a first locked position with the locking pin bore axially aligned with the shuttle pin bore, the locking pin arranged partially within the shuttle pin bore and partially within the locking pin bore with a first end of the locking pin at a first distance from a first axial face of the first housing, and the second end of the shuttle pin at a second distance from a first axial face of the second housing; and,
    a second unlocked position with the first end of the locking pin at a third distance from the first axial face of the first housing, and the second end of the shuttle pin at a fourth distance from the first axial face of the second housing, wherein the third distance is less than the first distance and the fourth distance is less than the second distance.

3. The switchable rocker arm of claim 2, including a resilient element in contact with the locking pin, the resilient element having a first compressed length in the first locked position and a second compressed length in the second unlocked position, wherein the first compressed length is greater than the second compressed length.

4. The switchable rocker arm of claim 3, wherein an actuator force acts upon the second end of the shuttle pin in the first locked position to axially urge the shuttle pin to the second unlocked position.

5. The switchable rocker arm of claim 1, wherein the second end of the shuttle pin is of frusto-conical form.

6. The switchable rocker arm of claim 1, further comprising a lost motion resilient element arranged to engage the cam arm assembly.

7. The switchable rocker arm of claim 1, further comprising a hydraulic lash adjuster arranged within the second housing.

8. The switchable rocker arm of claim 1, further comprising a cam roller follower arranged within the first housing.

9. A switchable rocker arm system comprising:
    a switchable rocker arm having:
        a cam arm assembly including a first housing with a first rocker shaft bore and a locking pin bore;
        a valve arm assembly, axially adjacent to the cam arm assembly, the valve
        arm assembly including a second housing with a second rocker shaft bore and a shuttle pin bore; wherein, the second rocker shaft bore is axially aligned with the first rocker shaft bore;
        a coupling assembly, including a locking pin arranged at least partially within the locking pin bore, and a shuttle pin arranged at least partially within the shuttle pin bore with a first end of the shuttle pin engaging the locking pin; and,
    an actuator having an actuator pin arranged to engage a second end of the shuttle pin.

10. The switchable rocker arm system of claim 9, further comprising a lost motion resilient element arranged to engage the cam arm assembly.

11. The switchable rocker arm system of claim 9, wherein a distal end of the actuator pin has an angled face.

12. The switchable rocker arm system of claim 9, wherein the actuator pin is supported by a housing.

13. The switchable rocker arm system of claim 9, wherein a distal end of the actuator pin is of frusto-conical form.

14. The switchable rocker arm system of claim 9, wherein the second end of the shuttle pin is of frusto-conical form.

\* \* \* \* \*